US011215483B2

(12) United States Patent
Smith et al.

(10) Patent No.: US 11,215,483 B2
(45) Date of Patent: *Jan. 4, 2022

(54) SENSOR SYSTEMS

(71) Applicant: Goodrich Corporation, Charlotte, NC (US)

(72) Inventors: Brian J. Smith, Maynard, MA (US); Alan M. Giles, Apple Valley, CA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,560

(22) Filed: Aug. 12, 2019

(65) Prior Publication Data

US 2019/0360846 A1    Nov. 28, 2019

Related U.S. Application Data

(63) Continuation of application No. 14/991,276, filed on Jan. 8, 2016, now Pat. No. 10,378,934, which is a continuation-in-part of application No. 14/612,170, filed on Feb. 2, 2015, now Pat. No. 9,267,824.

(51) Int. Cl.
*G01D 11/10* (2006.01)
*G02B 27/64* (2006.01)
*G01H 11/08* (2006.01)

(52) U.S. Cl.
CPC ............. *G01D 11/10* (2013.01); *G01H 11/08* (2013.01); *G02B 27/646* (2013.01)

(58) Field of Classification Search
CPC .................................. G01D 11/10; G01H 11/08
See application file for complete search history.

(56) References Cited

U.S. PATENT DOCUMENTS

| 4,188,612 A | * | 2/1980 | Kerr ....................... G01V 1/181 310/329 |
| 4,326,275 A | * | 4/1982 | Butler .................... G01V 1/181 310/329 |
| 5,128,905 A | * | 7/1992 | Arnott ................... B06B 1/0688 310/334 |

(Continued)

FOREIGN PATENT DOCUMENTS

| CN | 102880198 | 1/2013 |
| CN | 102880198 A | 1/2013 |

(Continued)

OTHER PUBLICATIONS

Duffy, K. P. et al., "Mechanical and Vibration Testing of Carbon Fiber Composite Material with Embedded Piezo-Electric Sensors", NASA Glenn Research Center, Cleveland, OH, 2012, pp. 1-14.

(Continued)

*Primary Examiner* — Jamel E Williams
(74) *Attorney, Agent, or Firm* — Locke Lord LLP; Scott D. Wofsy; Alicia J. Carroll

(57) ABSTRACT

A sensor assembly includes a frame defining a sensor axis having opposing endplates with axially extending supports. The opposing endplates are connected by a pair of axially extending side beams. A suspended mass is within an interior of the frame suspended from the supports of the frame. A plurality of piezoelectric material layers are operatively connected to sides of respective spacers opposite the frame to damp vibrations of the suspended mass.

15 Claims, 6 Drawing Sheets

(56) References Cited

U.S. PATENT DOCUMENTS

| | | | |
|---|---|---|---|
| 5,210,456 A | 5/1993 | Suzuki | |
| 5,359,445 A * | 10/1994 | Robertson | G01D 5/268 250/227.14 |
| 5,384,753 A * | 1/1995 | Sanders | G01V 1/189 181/122 |
| 5,668,318 A * | 9/1997 | Okada | G01C 19/56 73/504.11 |
| 5,691,471 A * | 11/1997 | Okazaki | G01C 19/56 73/504.03 |
| 6,004,639 A * | 12/1999 | Quigley | F16L 11/12 428/36.3 |
| 6,198,207 B1 * | 3/2001 | Lally | G01P 15/0915 310/340 |
| 7,321,185 B2 | 1/2008 | Schultz | |
| 7,580,323 B2 | 8/2009 | Allison et al. | |
| 7,880,565 B2 * | 2/2011 | Huang | B81C 1/00182 333/186 |
| 7,926,614 B2 * | 4/2011 | Tenghamn | G01V 1/184 181/121 |
| 2005/0062365 A1 * | 3/2005 | Tanimoto | F16F 15/005 310/327 |
| 2005/0066736 A1 * | 3/2005 | Ohbayashi | G01H 11/08 73/649 |
| 2008/0168840 A1 * | 7/2008 | Seeley | G01H 11/08 73/649 |
| 2009/0218911 A1 * | 9/2009 | Blanchard | B64G 1/641 310/314 |
| 2010/0103777 A1 * | 4/2010 | Chen | G01V 1/181 367/178 |
| 2011/0074162 A1 * | 3/2011 | Cottone | H02K 35/02 290/1 R |
| 2011/0261021 A1 | 10/2011 | Modarres et al. | |
| 2012/0104898 A1 * | 5/2012 | Qu | H04R 19/005 310/319 |
| 2014/0232646 A1 * | 8/2014 | Biggs | H01L 41/193 345/156 |
| 2014/0268380 A1 | 9/2014 | Szilagyi | |
| 2016/0097436 A1 * | 4/2016 | Goold | F16F 15/007 267/140.14 |

FOREIGN PATENT DOCUMENTS

| | | |
|---|---|---|
| CN | 103042940 A | 4/2013 |
| CN | 103050619 B | 10/2015 |
| DE | 19819025 | 11/1999 |
| DE | 19819025 A1 | 11/1999 |
| DE | 102010018048 | 10/2011 |
| DE | 102010018048 A1 | 10/2011 |
| DE | 102012208713 A1 | 11/2013 |
| DE | 1020122088713 | 11/2013 |
| EP | 1422440 | 5/2004 |
| EP | 1422440 A1 | 5/2004 |
| FR | 2692017 | 12/1993 |
| FR | 2692017 A1 | 12/1996 |
| FR | 2900144 | 10/2007 |
| FR | 2900144 A1 | 10/2007 |
| FR | 2951223 | 4/2011 |
| FR | 2951223 A1 | 4/2011 |
| JP | S60244863 | 12/1985 |
| JP | S60244863 A | 12/1985 |
| JP | 08094661 A | 4/1996 |
| JP | 08094661 | 4/2008 |
| KR | 100976530 | 8/2010 |
| KR | 100976530 B1 | 8/2010 |

OTHER PUBLICATIONS

Kavalovs, A. et al., "Active control of structures using macro-fiber composite (MFC)", Functional Materials and Nanotechnologies, (FM&NT 2007), Journal of Physics Conference Series, vol. 93, IOP Publishing, 2007, pp. 1-7.

Gallagher, J.A. et al. "Piezoelectric Damping of Macro-Fiber Composites", poster at UCLA Research and Technology Review, UCLA Department of Mechanical and Aerospace Engineering, May 8, 2013.

Gentilman et al., "Enhanced Performance Active Fiber Composites", in Smart Structures and Materials 2003; Industrial and Commercial Applications of Smart Structures Technologies, Proceedings of SPIE, vol. 5054, Society of Photo-Optical Instrumentation Engineers, 2003, pp. 350-359.

Partial European Search Report dated Jun. 22, 2016 issued on European Patent Application No. 16153771.7.

Extended European Search Report dated Oct. 7, 2016 issued during the prosecution of European Patent Application No. 16153771.7.

Extended European Search Report dated May 10, 2017 issued during the prosecution of European Patent Application No. 17150661.1.

Office Action dated Apr. 10, 2018 in European Application No. 17150661.1.

Communication under Article 94(3) EPC dated Dec. 5, 2018 issued EP Appilcation No. 17150661.1.

Extended European Search Report dated May 13, 2020, issued during the prosecution of European Patent Application No. EP 19219538.6.

Meyer, Y et al., "Active Isolation of Electronic Micro-Components With Piezoelectrically Transduced Silicon MEMS Devices". Smart Materials and Structures, IOP Publishing Ltd, GB,vol. 16, No. 1, Feb. 1, 2007, pp. 128-134.

EP Communication Pursuant to Article 94 (3) EPC, dated Aug. 14, 2020, issued during the prosecution of European Patent Application No. EP 16153771.7.

* cited by examiner

SENSOR SYSTEMS

CROSS-REFERENCE TO RELATED APPLICATIONS

This application is a continuation of U.S. patent application Ser. No. 14/991,276 filed on Jan. 8, 2016, which is a continuation-in-part of U.S. patent application Ser. No. 14/612,170 filed Feb. 2, 2015. The contents of both of these applications are hereby incorporated by reference herein in their entirety.

BACKGROUND OF THE INVENTION

1. Field of the Invention

The present disclosure relates to sensor systems, and more particularly to sensor assemblies such as those used in imaging devices.

2. Description of Related Art

A variety of devices and methods are known in the art for sensor systems on aircraft. One parameter that directly affects the quality of many of the images collected by the sensor systems is line-of-sight (LOS) stabilization. One source of sensor LOS destabilization is vibration within the sensor system. Vibrations can be created by environmental influences on the sensor system (e.g. wind drag and turbulence), by operational factors, by platform sources (e.g. aircraft vibrations) and by components within the sensor itself (e.g. fans, heaters, etc.). By reducing or damping vibrations acting on the sensor system, LOS stabilization can be improved, resulting in improved quality of images and other data captured by the sensor.

Current sensor systems have generally been considered satisfactory for their intended purpose. However, there is still a need in the art for improved sensor systems. The present disclosure provides a solution for this need.

SUMMARY OF THE INVENTION

A sensor assembly includes a frame and a suspended mass within an interior of the frame defining a sensor axis. The sensor assembly includes a piezoelectric material layer operatively connected to the frame to damp vibrations of the suspended mass.

The frame can include composite layers, for example, fiber reinforced polymer (FRP) composite layers. The piezoelectric material layer can be layered between the FRP composite layers. The piezoelectric material layer can be a macro-fiber composite (MFC) piezoelectric material layer. The frame can include inwardly extending supports to which the suspended mass is suspended from. At least one of the inwardly extending supports can include FRP composite layers. The piezoelectric material layer can be operatively connected to one of the supports of the frame. The piezoelectric material layer can be layered within the FRP composite layers of at least one of the supports of the frame. The frame can include a pair of endplates spaced apart from one another along the sensor axis, and a pair of axially extending side beams connecting the pair of endplates. At least one of the endplates can include FRP composite layers. The piezoelectric material layer can be operatively connected to an outer surface of one of the endplates of the frame. The piezoelectric material layer can be operatively connected to an inner surface of one of the endplates of the frame. It is contemplated that the piezoelectric material layer can be layered within the FRP composite layers of at least one of the endplates of the frame.

In accordance with another aspect, a sensor assembly includes a frame defining a sensor axis having opposing endplates with axially extending supports. The opposing endplates are connected by a pair of axially extending side beams. A suspended mass is suspended within an interior of the frame from the supports of the frame. A plurality of piezoelectric material layers are operatively connected to the endplates and supports of the frame to damp vibrations of the suspended mass.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
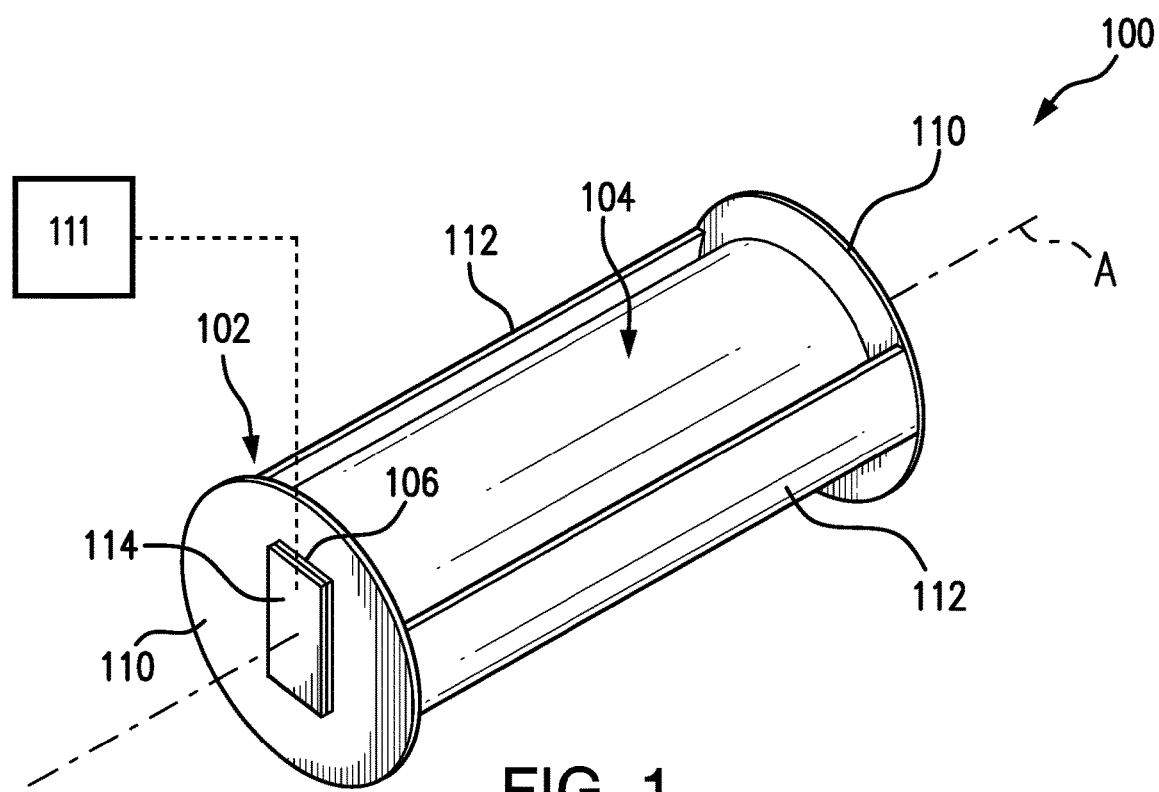
FIG. 1 is a perspective view of an exemplary embodiment of a sensor system constructed in accordance with the present disclosure, showing the frame and the suspended mass.

Reference will now be made to the drawings wherein like reference numerals identify similar structural features or aspects of the subject disclosure. For purposes of explanation and illustration, and not limitation, a partial view of an exemplary embodiment of a sensor assembly constructed in accordance with the disclosure is shown in FIG. 1 and is designated generally by reference character 100. Other embodiments of sensor assemblies in accordance with this disclosure, or aspects thereof, are provided in FIGS. 2-11, as will be described. The systems and methods described herein can be used to reduce vibration experienced by sensor assemblies and reduce the weight of sensor assemblies.

As shown in FIG. 1, a sensor assembly 100 includes a frame 102, a suspended mass 104 within an interior of frame 102 defining a sensor axis A, and a spacer 106 operatively connected to frame 102. A piezoelectric material layer 114 is operatively connected to a side of spacer 106 opposite of frame 102 to damp vibrations. Those skilled in the art will readily appreciate that suspended mass 104 can include a variety of electrical, optical and/or mechanical sensor components, and/or accessories therefor. It is contemplated that piezoelectric material layer 114 can be a macro-fiber composite (MFC) piezoelectric material layer, such as an MFC piezoelectric material available from Smart Material Corp., Sarasota, Fla. A MFC piezoelectric material includes piezoelectric ceramic fibers arranged in a specific sequence that results in an electro-mechanical response either when exposed to strains created by vibration-induced material deformation or when commanded to exert mechanical force that creates material deformation by applying a specifically controlled electrical signal to the MFC. This electro-mechanical response can be commanded to elongate or contract the structure to counteract unwanted measured vibrational strains, providing a lightweight alternative to traditional damping systems.

With continued reference to FIG. 1, spacer 106 acts as a moment arm to increase the damping effect of piezoelectric material layers 114. Those skilled in the art will readily appreciate that spacer 106 can be a non-piezoelectric material spacer and/or can be a MFC piezoelectric material spacer. It is contemplated that if spacer 106 is a piezoelectric material electrically connected in a similar manner as piezoelectric material layer 114, the overall damping force applied at a given location can be doubled. Even if not electrically charged, a spacer 106 that is a piezoelectric material would act to increase the moment arm but would not impart any damping force itself. Those skilled in the art will readily appreciate that one or more spacers 106 can be used, and/or piezoelectric material layer 114 can be laminated onto a surface of spacer 106. Additionally, it is contemplated that the shape and thickness of spacer 106 can vary as needed for a given application.

In use, piezoelectric material layer 114 can be actively or proactively controlled. For example, for active control in accordance with some embodiments, piezoelectric material layers 114 are operatively connected to a digital signal processor, e.g. a controller 111. The digital signal processor can provide instructions to piezoelectric material layers 114 based on real-time vibration data received from vibration sensors arranged throughout sensor assembly 100 to actively damp vibrations in assembly 100 via a closed-loop arrangement. For proactive control, an electric signal from controller 111 can be used to actuate piezoelectric material layers 114 based upon characteristic information of vibration causing influences measured prior to the real-time events that cause the vibration, such as turbulence, to proactively damp vibrations in the frame.

Figure 2:
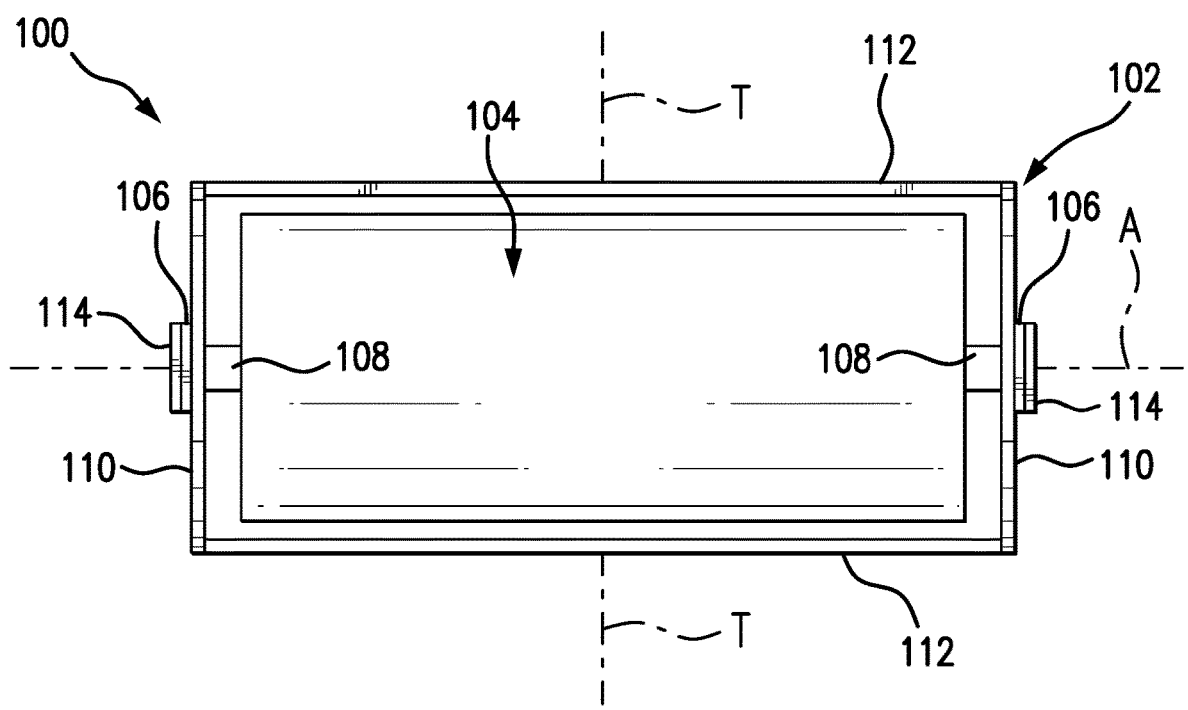
FIG. 2 is a top plan view of the sensor system of FIG. 1, showing the supports.

Now with reference to FIG. 2, frame 102 includes inwardly extending supports 108 to which suspended mass 104 is suspended from, and a pair of endplates 110 spaced apart from one another along sensor axis A. A pair of axially extending side beams 112 connect endplates 110. Spacers 106 and piezoelectric material layers 114 are arranged in a mirrored configuration with respect to an axis T transverse to longitudinal axis A. This mirrored configuration permits piezoelectric material layers 114 to apply equal and opposite damping forces, therein providing even damping to the frame.

Figure 3:
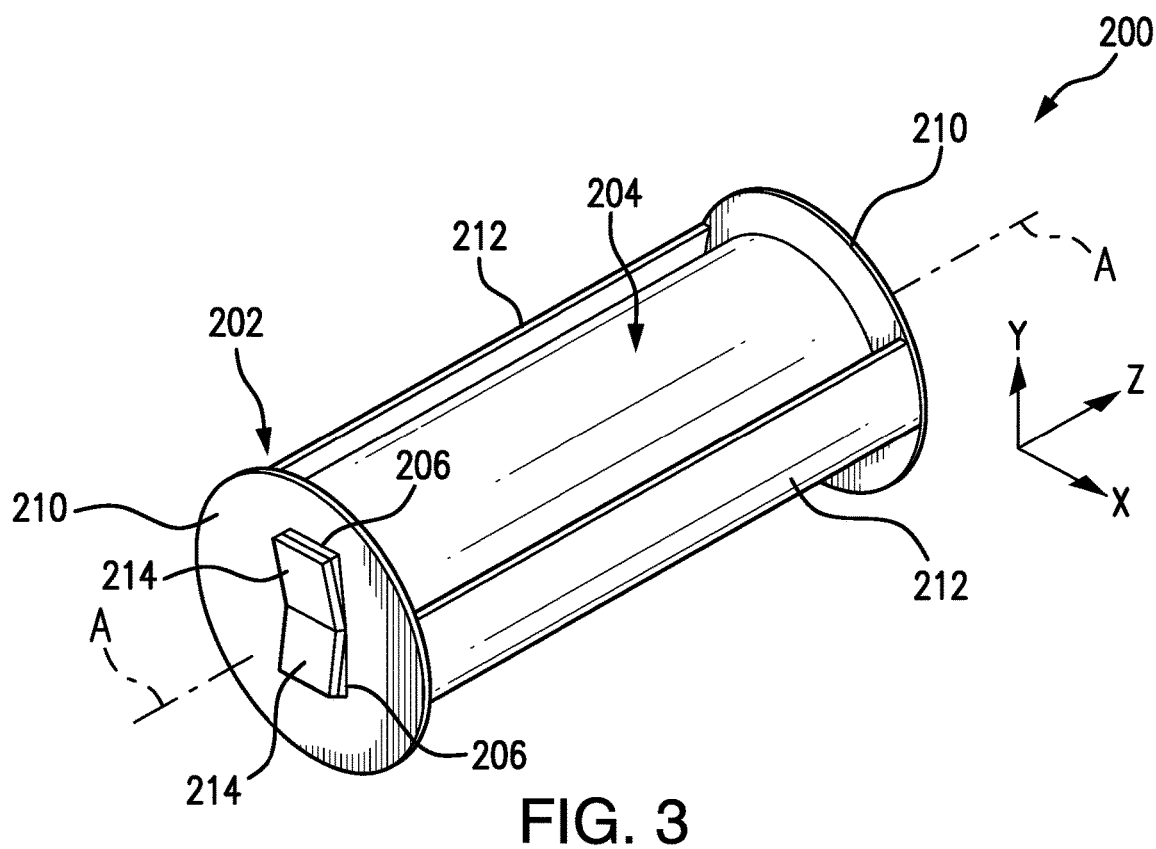
FIG. 3 is a perspective view of another exemplary embodiment of a sensor system constructed in accordance with the present disclosure, showing the frame and the suspended mass.

As shown in FIG. 3, a sensor assembly 200, similar to sensor assembly 100, includes a frame 202, a suspended mass 204 defining a sensor axis A, and a spacer 206 operatively connected to frame 202. A piezoelectric material layer 214 is operatively connected to a side of spacer 206 opposite of frame 202 to damp vibrations. Spacers 206 on endplate 210 of sensor assembly 200 are wedged shaped. Each wedged shaped spacer 206 permits its respective piezoelectric material layer 214 to apply force in two directions. For example, piezoelectric material layers 214 on endplates 210 apply force in a z direction and a y direction, while piezoelectric material layers 214 on supports 208 apply force in an x direction and a y direction. It is contemplated that the wedge shape can be altered to provide damping forces in the desired directions.

Figure 4:
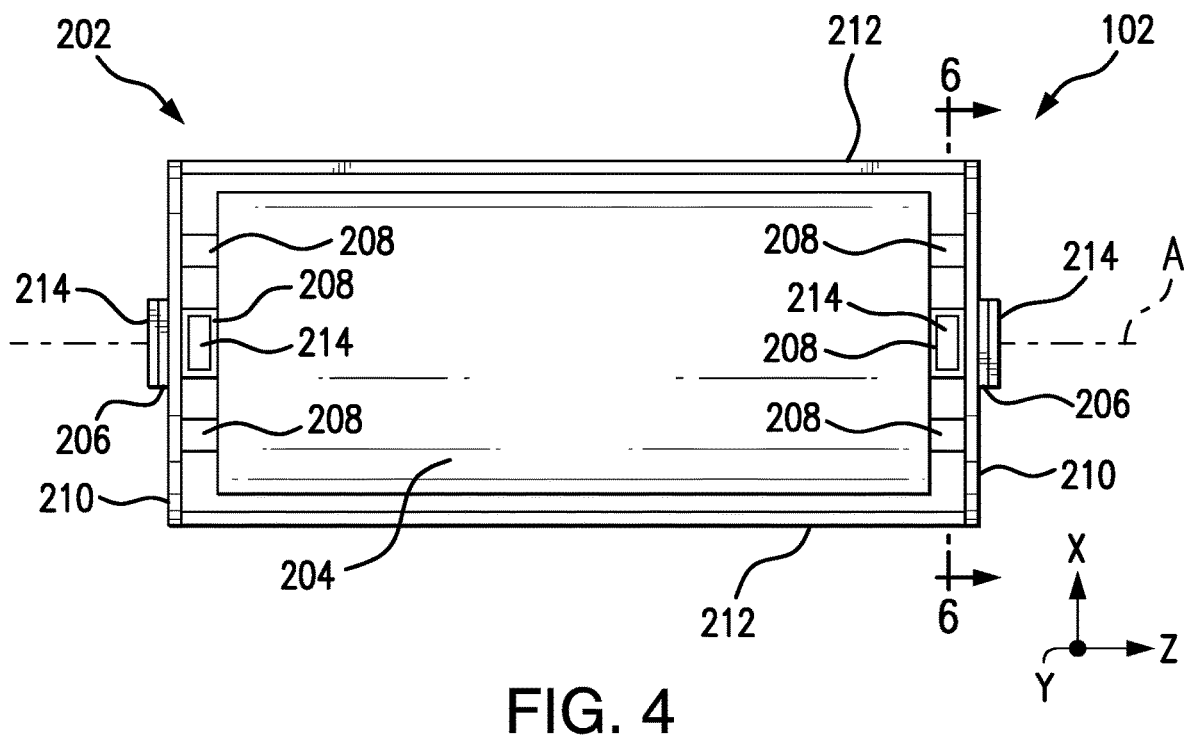
FIG. 4 is a top plan view of the sensor system of FIG. 3, showing the supports and the endplates having a piezoelectric material layer.
Figure 5:
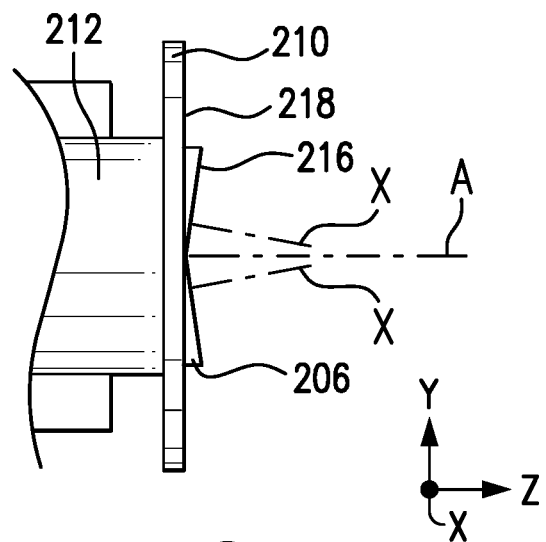
FIG. 5 is a side elevation view of a portion of the sensor system of FIG. 3, showing the surface of the spacer at an angle with respect to a surface of the frame.
Figure 6:
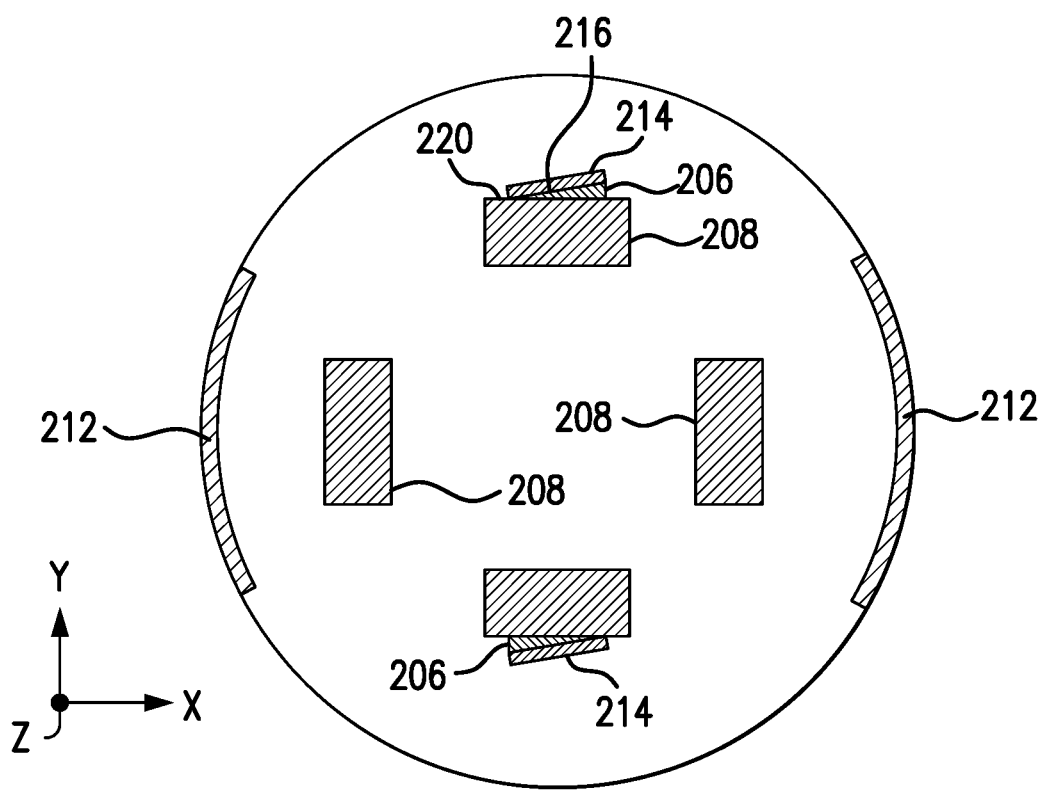
FIG. 6 is a cross-sectional end view of the sensor system of FIG. 3, showing the supports with a spacer between a side of the stub beam and the piezoelectric material layer.

With reference now to FIGS. 4-6, spacers 206 are operatively connected to endplates 210 and supports 208 of frame 202. While spacers 206 and their corresponding piezoelectric material layers 214 are described herein as being placed on supports 208 and endplates 210 of frame 202, it is contemplated that spacers 206 and piezoelectric material layers 214 can be can be placed in a variety of locations on frame 202 that experience or are expected to experience vibration induced displacement or deflection. For example, a 3-dimensional arrangement of piezoelectric devices, as shown in FIGS. 3-6, would be required to cancel 3-dimensional vibrational influences. Wedged shaped spacers 206 include a spacer surface 216 at an angle with respect to which ever frame surface to which it is operatively connected. For example, spacer surface 216 is at an angle with respect to endplate outer surface 218. This is shown by an axis X extending perpendicularly from surface 216 being at an angle with respect to longitudinal axis A, which is perpendicular to endplate outer surface 218. Spacer surface 216 is also at an angle with respect to a surface 220 of one of supports 208. The angle of spacer surface 216 with respect to whichever frame surface it is operatively connected to ranges from 1 degree to 45 degrees, for example from 5 degrees to 20 degrees, or more particularly from 10 degrees to 15 degrees.

Figure 7:
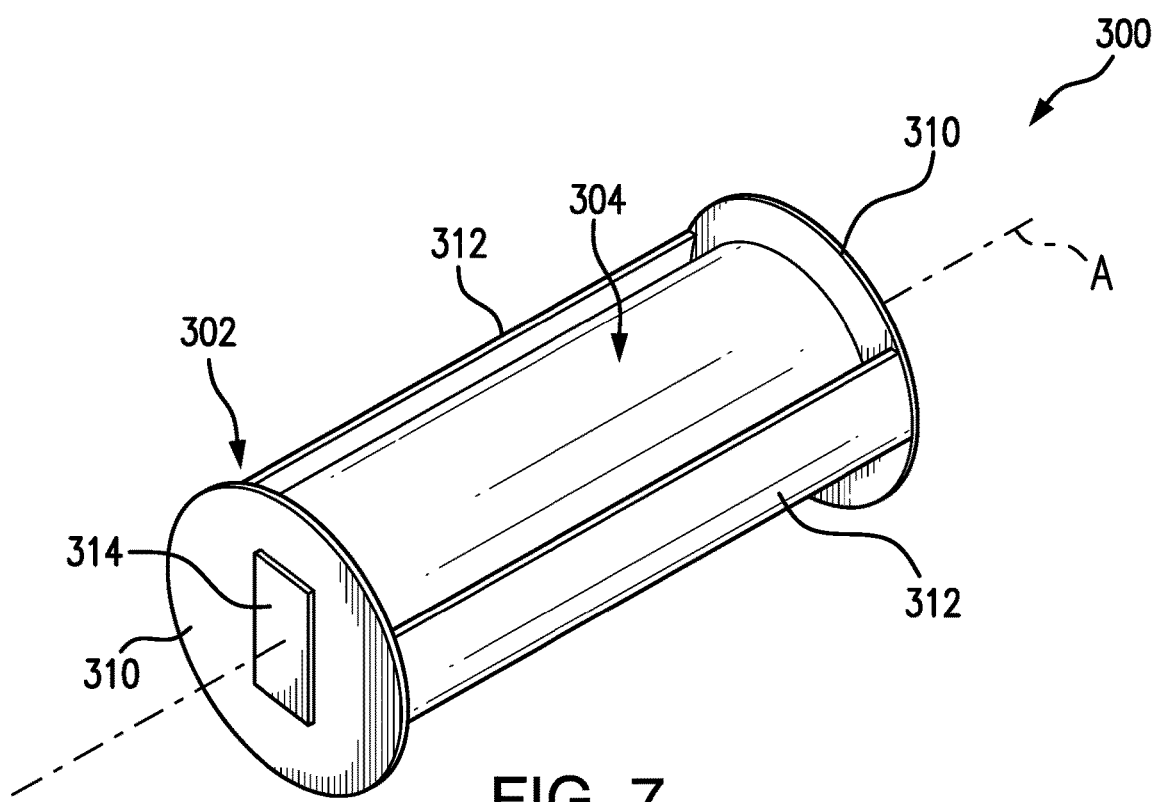
FIG. 7 is a perspective view of another exemplary embodiment of a sensor system constructed in accordance with the present disclosure, showing the frame and the suspended mass and a piezoelectric material layer on the frame.

As shown in FIG. 7, a sensor assembly 300 is similar to sensor assembly 100. A piezoelectric material layer 314, similar to piezoelectric material layer 114, is operatively connected directly to frame 302 to damp vibrations. Those skilled in the art will readily appreciate that suspended mass 304 can include a variety of electrical, optical and/or mechanical sensor components, and/or accessories therefor. It is contemplated that piezoelectric material layer 314 can be a macro-fiber composite (MFC) piezoelectric material layer, such as those described above.

Figure 8:
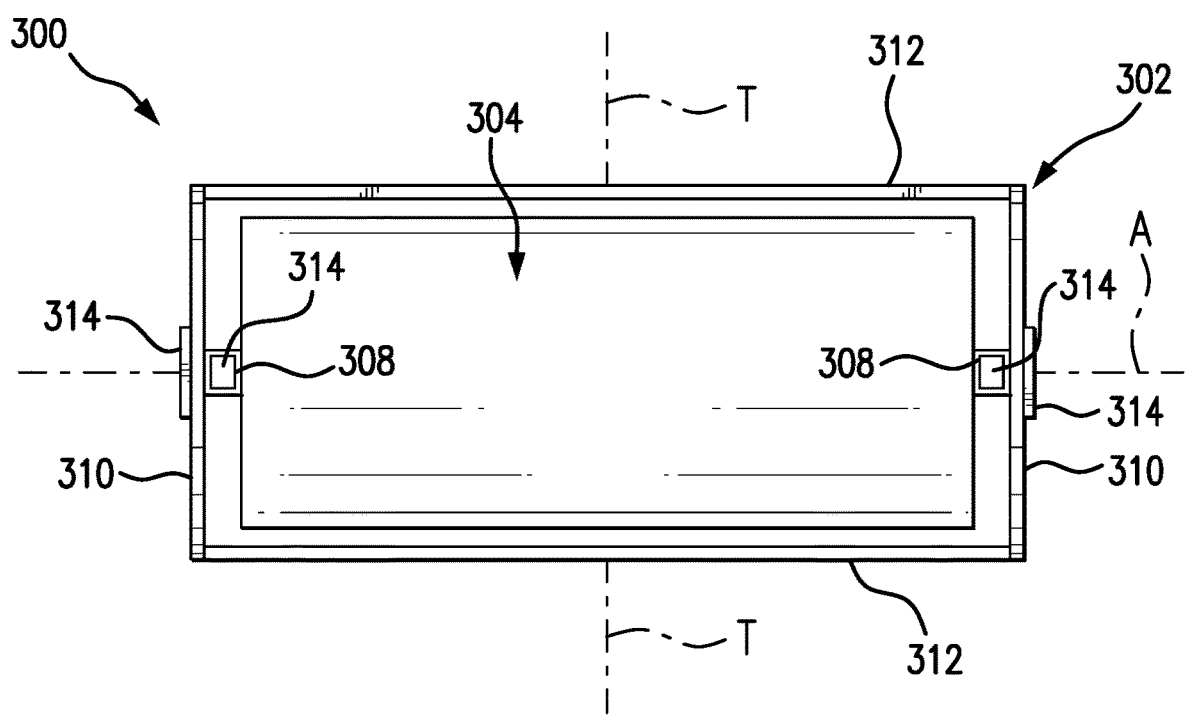
FIG. 8 is a top plan view of the sensor system of FIG. 7, showing the supports having piezoelectric material layers.

Now with reference to FIG. 8, frame 302 includes inwardly extending supports 308 to which suspended mass 304 is suspended from, and a pair of endplates 310 spaced apart from one another along sensor axis A, similar to frame 102, described above. A pair of axially extending side beams 312 connects endplates 310. Piezoelectric material layers 314 are arranged similarly to piezoelectric material layers 114, except they are directly connected to frame 302, instead of through spacers. Piezoelectric material layers 314 are also operatively connected to supports 308 of frame 302. It is also contemplated that piezoelectric material layers 314 can be connected to side beams 312. In accordance with some embodiments, a sensor assembly, e.g. sensor assembly 100, 200 and/or 300, can include a variety of piezoelectric configurations. For example, some attached to a frame with spacers, some directly attached to the frame and some layered within composite layers of the frame, as will be described below. By applying the piezoelectric material layers 314 directly to frame 302 or within the architecture of a frame, as described below, the possibility that piezoelectric material layers, e.g. layer 314, will be damaged or knocked off during maintenance or repair operations can be eliminated or reduced, increasing the durability of the assembly over its service life.

Figure 9:
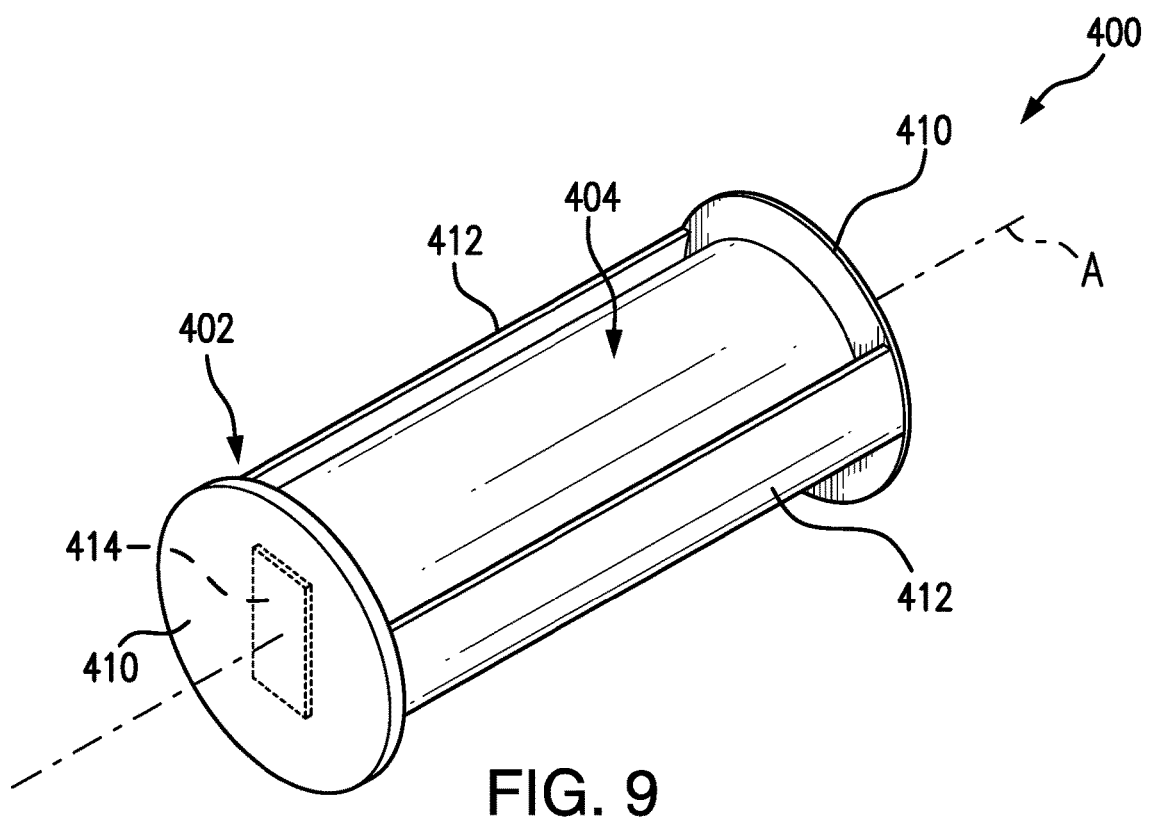
FIG. 9 is a perspective view of another exemplary embodiment of a sensor system constructed in accordance with the present disclosure, showing the frame and the suspended mass, with a piezoelectric material layer layered within an endplate of the frame.
Figure 10:
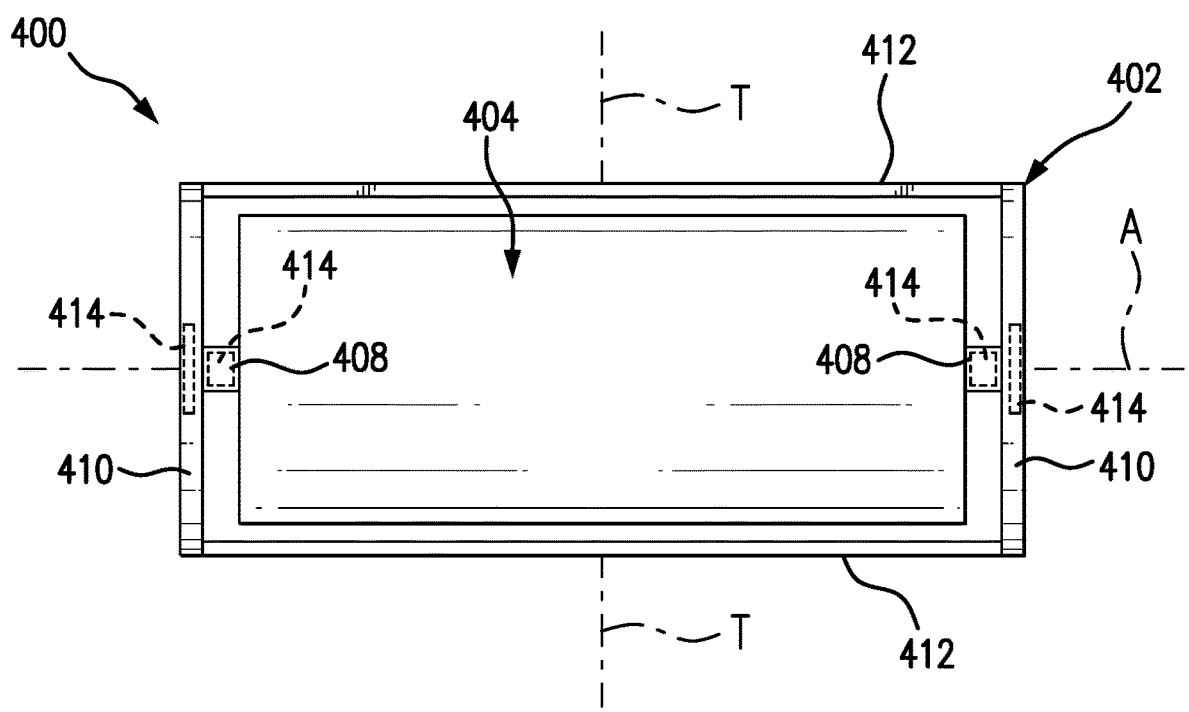
FIG. 10 is a top plan view of the sensor system of FIG. 9, showing piezoelectric material layers layered within the supports.
Figure 11:
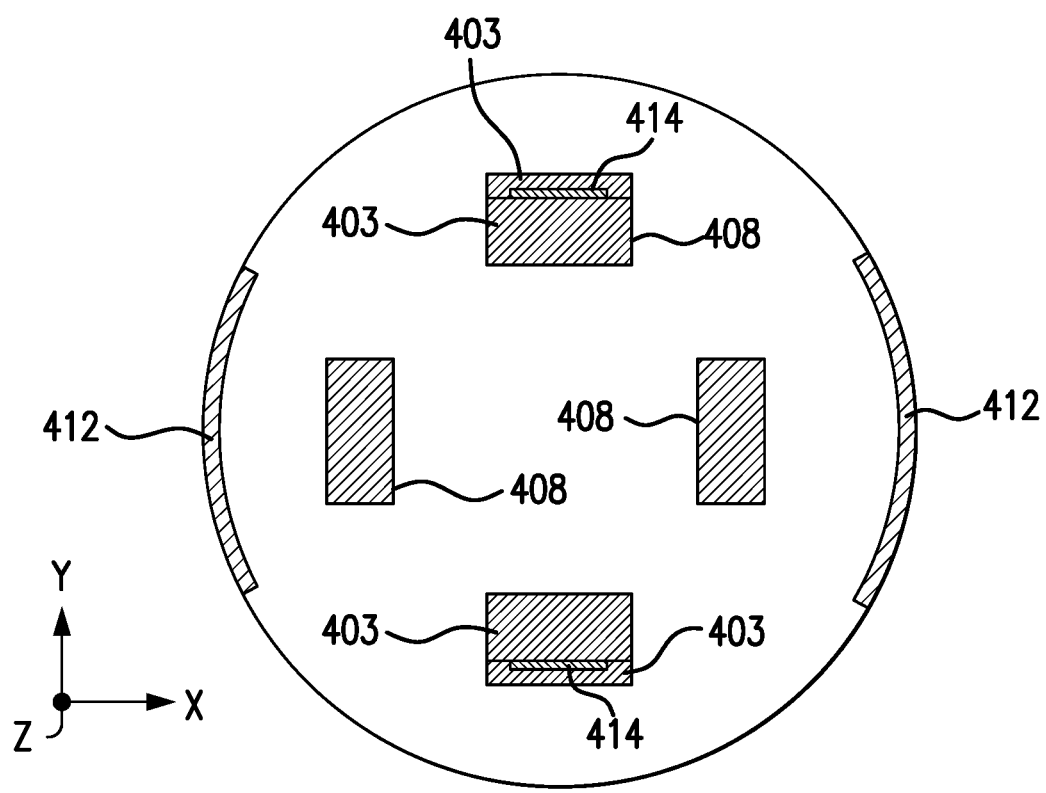
FIG. 11 is a cross-sectional end view of the sensor system of FIG. 9, showing composite layers of the frame with the piezoelectric material layer therebetween.

As shown in FIGS. 9-11, a sensor assembly 400 is similar to sensor assembly 300. A piezoelectric material layer 414, similar to piezoelectric material layer 314, is operatively connected directly to frame 402 to damp vibrations. Frame 402 is made from at least one layer of fiber reinforced polymer (FRP) composite 403. Piezoelectric material layer 414 is layered, e.g. laminated, within FRP composite layers 403 of respective endplates 410 of frame 402. Layers 403 are visible in the cross-sectional view of FIG. 11 in supports 408. Similar FRP composite layers 403 make up endplates 410. It is contemplated that frame 402 can include any suitable number of FRP composite layers 403. Piezoelectric material layer 414 can be a macro-fiber composite (MFC) piezoelectric material layer, as described above. Frame 402 includes inwardly extending supports 408 to which suspended mass 404 is suspended from. Supports 408 also include layers of FRP composite material 403. In accordance with one embodiment, piezoelectric material layers 414 are layered within FRP composite layers 403 of respective supports 408 of frame 402. Frame 402 includes a pair of axially extending side beams 412 connecting endplates 410. It is also contemplated that piezoelectric material layers 414 can be laminated within side beams 412.

While frames, e.g. frames 102, 202, 302 and 402, are shown as single frames, it is contemplated that, in some embodiments, the frames are intermediate frames between their respective suspended masses and respective outer frames. An outer frame is similar to the intermediate frame, e.g. frames 102, 202, 302 and 402, in that it can include a piezoelectric material layer, e.g. piezoelectric material layers 114, 214, 314, and/or 414, applied directly thereon, through a spacer, and/or through lamination in the frame itself. The outer frame similarly includes a suspended mass within its interior. The piezoelectric material layer, described above, is operatively connected to the outer frame to damp vibrations of the suspended mass. For the outer frame, however, there is one or more intermediate frames between the suspended mass (or masses) and the outer frame. The outer frame can include supports, e.g. supports 108, 208, 308 and/or 408, to connect it to the intermediate frame. The intermediate frame, in turn, operatively connects the suspended mass to the outer frame.

The methods and systems of the present disclosure, as described above and shown in the drawings, provide for sensor assemblies with superior properties including enhanced sensor imaging and/or data collecting capabilities due to reduced vibration and reduced weight. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A sensor assembly comprising:
a frame;
a suspended mass within an interior of the frame defining a sensor axis; and
a piezoelectric material layer operatively connected to the frame to damp vibrations of the suspended mass.

2. A sensor assembly as recited in claim 1, wherein the frame includes fiber reinforced polymer (FRP) composite layers, wherein the piezoelectric material layer is layered between the composite layers.

3. A sensor assembly comprising:
a frame;
a suspended mass within an interior of the frame defining a sensor axis; and
a piezoelectric material layer operatively connected to the frame to damp vibrations of the suspended mass, wherein the piezoelectric material layer is a macro-fiber composite (MFC) piezoelectric material layer.

4. A sensor assembly comprising:
a frame;
a suspended mass within an interior of the frame defining a sensor axis; and
a piezoelectric material layer operatively connected to the frame to damp vibrations of the suspended mass, wherein the frame includes inwardly extending supports to which the suspended mass is suspended from.

5. A sensor assembly as recited in claim 4, wherein the piezoelectric material layer is operatively connected to one of the supports of the frame.

6. A sensor assembly as recited in claim 4, wherein at least one of the supports includes FRP composite layers, wherein the piezoelectric material layer is layered between the FRP composite layers of at least one of the supports of the frame.

7. A sensor assembly comprising:
a frame;
a suspended mass within an interior of the frame defining a sensor axis; and
a piezoelectric material layer operatively connected to the frame to damp vibrations of the suspended mass, wherein the frame includes a pair of endplates spaced apart from one another along the sensor axis, and a pair of axially extending side beams connecting the pair of endplates.

8. A sensor assembly as recited in claim 7, wherein the piezoelectric material layer is operatively connected to an outer surface of one of the endplates of the frame.

9. A sensor assembly as recited in claim 7, wherein the piezoelectric material layer is operatively connected to an inner surface of one of the endplates of the frame.

10. A sensor assembly as recited in claim 7, wherein at least one of the endplates of the frame includes FRP composite layers, wherein the piezoelectric material layer is layered between the FRP composite layers of at least one of the endplates.

11. A sensor assembly comprising:
a frame defining a sensor axis having opposing endplates with axially extending supports, wherein the opposing endplates are connected by a pair of axially extending side beams;
a suspended mass suspended within an interior of the frame from the supports of the frame; and
a plurality of piezoelectric material layers operatively connected to at least one of the endplates or supports of the frame to damp vibrations of the suspended mass.

12. A sensor assembly as recited in claim 11, wherein at least one of the piezoelectric material layers is a macro-fiber composite (MFC) piezoelectric material layer.

13. A sensor assembly as recited in claim 11, wherein the frame includes FRP composite layers, and wherein at least one of the piezoelectric material layers is layered between the FRP composite layers of the frame.

14. A sensor assembly as recited in claim 11, wherein at least one of the piezoelectric material layers is operatively connected to one of the supports of the frame.

15. A sensor assembly as recited in claim 11, wherein at least one of the piezoelectric material layers is operatively connected to one of the endplates of the frame.

* * * * *